Figure 1:
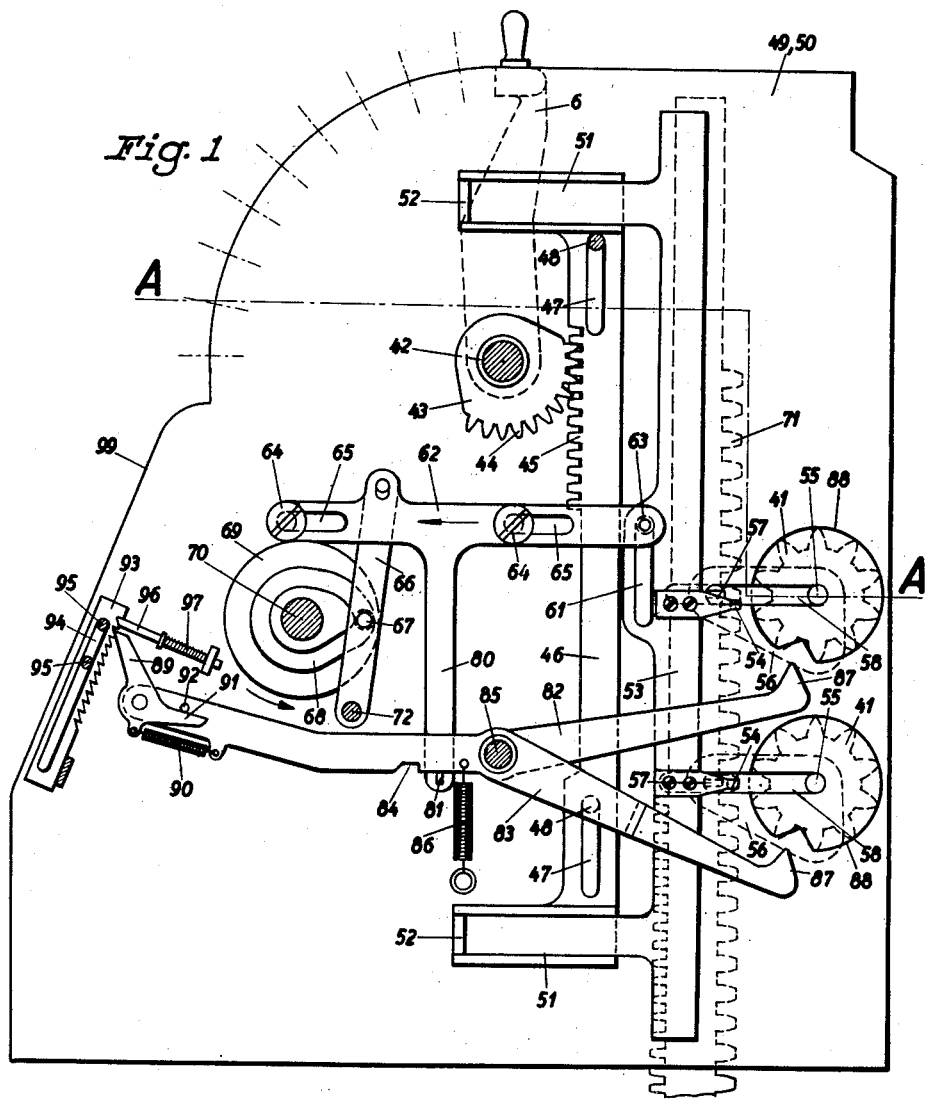

May 27, 1952     A. KLAAR     2,598,270
INDICATING DEVICE ON CASH REGISTERS
Filed Aug. 18, 1949     2 SHEETS—SHEET 2
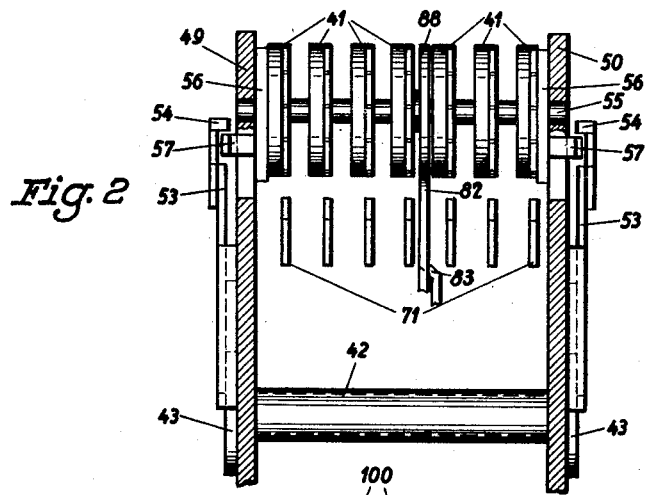
Fig. 2
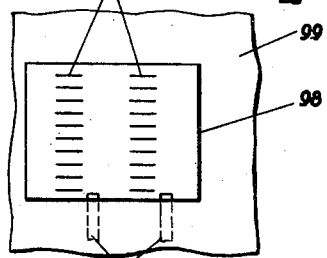
Fig. 3
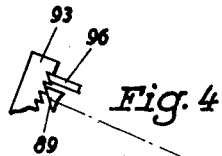
Fig. 4
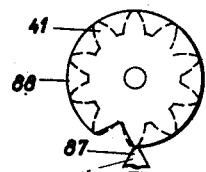
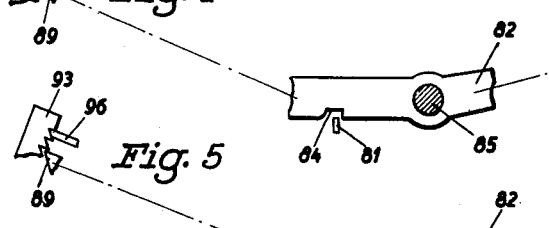
Fig. 5
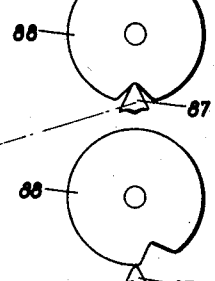
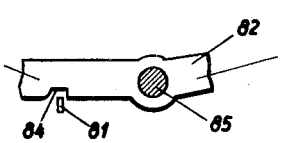
Fig. 6
Inventor:
Albert Klaar
by Knight Bros
attys Patented May 27, 1952

2,598,270

UNITED STATES PATENT OFFICE 2,598,270

INDICATING DEVICE ON CASH REGISTERS

Albert Klaar, Bielefeld, Germany, assignor to Anker-Werke, A. G., Bielefeld, Germany, a corporation of Germany Application August 18, 1949, Serial No. 111,059

6 Claims. (Cl. 235—23)

1

The invention relates to cash registers and the like machines and more specifically to devices on such machines for indicating the totals of selectively accumulated items.

It is an object of the invention to offer to the sales clerks or waiters in stores or restaurants an incentive toward increased sales by affording each clerk the possibility of informing himself of the sales totals of the other clerks, thus stimulating increased efforts of clerks showing lesser totals than others. However, since it is usually not desired to indicate to each clerk the grand total of sales, it is another object of the invention to present the information on the sales of the individual clerks in such a manner as to prevent or make difficult deducing therefrom the amount of the grand total.

In accordance with the invention, a cash register or the like business machine is equipped with indicating devices that are controlled by the selective register control means to be actuated for or by the respective clerks or waiters, and these indicating devices are visible from the operator's or customer's side and arranged in such mutual relation as to comparatively indicate the respective totalized quantities. According to another feature of the invention, the indicating devices have graph-type indicating means, i. e. their indicia are diagrammatic and, while permitting a comparison, do not indicate the numerical amounts of the respective clerks' totals. The indicating devices are operatively connected with the respective adding or totalizing mechanisms selected for operation by the clerk identifying key means or manual of the machine. These adding mechanisms are either those that accumulate the sales amounts of the respective clerks or—if a comparative indication of the number of waited-on customers is desired—those that count the customers or sales items of the respective clerks. If desired, the indicating devices may also be connected with the sales amount adding mechanisms as well as with the customer or item counters.

The foregoing and more specific objects and features of the invention will be more fully understood from the following description of the embodiment exemplified by the drawings in which:

Figure 1 is a side view of a cash register with indicating means according to the invention, Fig. 2 shows a part-sectional top view of an adding mechanism of the same cash register, the section being taken along the line A—A shown in Fig. 1,

2

Fig. 3 shows part of the cover of the same cash register including an indicator window, and Figs. 4 to 6 show schematically one of the indicating devices of the cash register in different indicating positions, respectively.

The clerk identifying control means of the illustrated machine are exemplified by a control lever 6 which is mounted on a tubular shaft 42 and adjustable to different angular positions assigned to the respective sales clerks. The machine has several adding mechanisms or totalizers, comprising adding wheels 41, for totalling the sales amounts of the respective clerks. For simplicity, only two such totalizers are shown in Fig. 1 and only one of them is separately illustrated in Fig. 2, although it will be understood that there are as many such totalizers as the lever 6 has clerk-identifying positions. By adjusting the lever to a selected position in accordance with the clerk whose transaction is to be registered, the corresponding one of the totalizers is placed in operative connection with the amount registering means of the cash register, while the other totalizers remain inactive. This selection is effected by two gear sectors 43 firmly mounted on the tubular shaft 42. The gear teeth 44 of each sector 43 mesh with rack teeth 45 of one of two vertically displaceable carriers 46 respectively. Each carrier 46 has elongated openings 47 traversed by stationary guide pins 48 that are fastened to the side walls 49, 50 of the machine. Each carrier 46 has two slide bearings 51 at its upper and lower ends respectively. Two coupling bars 53 are slidably mounted on the respective carriers. Each coupling bar has two arms 52 horizontally displaceable in the respective slide bearings 51 of the appertaining carrier. Each coupling bar 53 has coupling lugs or grippers 54, one for each totalizer. The lugs 54 on each bar 53 are displaced relative to one another so that, when the control lever 6 is adjusted to a different position, two different coupling projections 54 on the respective bars 53 are placed in operative position relative to the same adding mechanism, as will be further explained in the following.

The axle 55 of each totalizer is journalled in a frame 56. This frame has two pins 57 whose free ends are stepped to correspond to the width of the adjacent coupling lugs 54. The totalizer axle 55 and the pins 57 are laterally displaceable in horizontal slots 58 of the side walls 49, 50. Each coupling bar 53 has a vertical slot 61 engaged by the pin 63 of a link member 62 which is horizontally displaceable on two guide pins 64 passing through respective slots 65 of the link member. A drive lever 66, movable about a stationary pivot 72, has a roller 67 in engagement with a cam groove 68 of a cam disc 69 mounted on a shaft 70. Shaft 70 performs one complete counterclockwise revolution for each registering operation of the machine. A number of vertically displaceable racks 71 cooperate with the respective amount setting levers (not illustrated) of the machine, i. e. there is a different rack 71 for each digit of the amount setting board of the machine. During each registering operation, the racks 71 move once up and down a distance depending upon the respective digit values of the amount to be registered. The mechanism for thus moving the racks is not illustrated because suitable mechanisms are well known in various designs and their particular construction is not essential to the invention. The teeth of racks 71 are engageable with those of the totalizer wheels 41, but these wheels are normally spaced from the racks and operate only when the totalizer is moved into engagement with the racks.

When control lever 6 is in the illustrated position, only the lower totalizer is in operative condition, i. e. the lower coupling lugs 54 of the two coupling bars 53 are then horizontally in line with the ends of the respective pins 57 (see Fig. 2) of the lower totalizer while the other coupling lugs 54 are then out of alignment with the respective pins 57 of the other totalizers. During a registering operation of the machine, cam 69 causes drive lever 66 to move link member 62 and thus the coupling bars 53 toward the left. The lower coupling lugs 54 of bars 53 abut against the adjacent pins 57 and thus move the lower totalizer toward and into meshing engagement with the racks 71. Consequently, only the lower totalizer is now in operation. Near the end of the revolution of cam 69, the link member 62 moves back to the illustrated position so that the lower coupling lugs 54 return the totalizer into the illustrated rest position.

When control lever 6 is adjusted to a different position, for instance, the one next following the illustrated position, the segments 43 raise the carriers 46 with the appertaining coupling bars 53 and thus place a different pair of coupling lugs 54, for instance, the upper ones, as shown in Fig. 1, into horizontal alignment with the coupling pins of the upper adding device while the projections 54 and pins 57 of the lower adding mechanism are now out of alignment. Therefore, during the registering operation, only the selected upper totalizer is moved into engagement with the racks 71 and thereafter returned to its rest position. In this manner the sales items of each individual clerk are totalled by the one totalizer assigned to that clerk, under control by the selective adjustment of the clerk-identifying control means of the cash register.

The link member 62 has an arm 80 with a stop pin 81 projecting into the respective paths of two levers 82, 83 appertaining to respective stepping drives. Each lever has a notch 84 to catch over the pin 81 when the arm 80 is in a corresponding position. The levers 82, 83 are pivoted on a shaft 85, and each lever is biased by a spring 86 toward abutment against the stop pin 81. One end of each lever has a wedge shaped projection 87 to cooperate with respective cams of the different adding mechanisms. For instance, the wedge-shaped projections 87 are placed in cooperative relation with the respective cam discs 88 of the ten-digit (ten-dollar) wheel of the respective totalizer. The other end of each lever 82, 83 carries a pawl 89 biased by a spring 90 so that a projection 91 of pawl 89 normally rests against a stop pin 92 mounted on the lever. The pawls 89 engage rack teeth of respective slidable indicating members 93 which have a slot 94 traversed by stationary guide pins 95. Each slider 93 has a separate detent 96 biased by a spring 97 into engagement with the rack teeth of the slider.

It will be understood from the foregoing that the sliders 93 are correlated to the respective adding mechanisms or totalizers and to the clerk identifying adjustments of the control lever 6. The sliders, of which only two are shown, are arranged side by side and their top ends, which serve as indicia means, are visible from the operator's place of the cash register through a window 98 in the machine housing 99. As will be explained, the sliders move stepwise and progressively upward in proportion to the amounts accumulated by the respective totalizers so that the slider lengths visible through the window 98 are an indication of the comparative total amounts. Markings, such as the cross lines 100, on window 98 facilitate recognizing and comparing the indications.

The just-mentioned indicating means operate as follows. Near the end of the above-described movement of a totalizer into meshing engagement with the racks 71, the stop pin 81 enters into the range of the notches 84 of the levers 82, 83. This permits each lever to turn counterclockwise under the bias of its spring 86 but only if the cam notch of the respective cam disc 88 is then just opposite the wedge-shaped end 87 of the lever. This occurs when the tens wheel (ten-dollar wheel) of the adding device advances from position nine to position zero. Hence, during that one step of movement, the wedge-shaped end 87 of the lever moves into the cam notch and is moved back again, in the manner apparent from the three phases of this movement shown in Figs. 4, 5, and 6, respectively. As a result, the lever moves first counterclockwise until its notch 84 abuts against pin 81 (Fig. 5) and then clockwise back to the normal position, thus lowering the pawl 89 and lifting it again. In this manner each slider 93 is raised one step for each ten-dollar or other chosen unit counted by the adding mechanism assigned to a particular sales clerk or waiter. At any time, the sliders 93 can be reset to the initial positions by the proprietor or other authorized person having access to the pawl and detent releasing device (not illustrated).

While in the foregoing description particular reference is made to the example of a lever-type cash register, the invention is similarly applicable to machines with other types of control or amount-setting means; and the indicating device may be connected with item or customer counting mechanisms rather than with the amount totalling devices exemplified in the foregoing. It will be obvious to those skilled in the art that such and other modifications are readily available without departing from the objects and features of the invention and within the scope of the claims annexed hereto.

I claim:

1. In combination, a cash register having registering means and clerk-identifying selector means, totalizers for accumulating the sales amounts of the respective clerks, coupling means for selectively coupling said totalizers with said registering means under control by said selector means, a plurality of indicating members progressively movable in mutually correlated positions and visible from the outside, respective drive means having each a movable part engageable with one of said respective members and engageable with one of said respective totalizers for moving said one member under control by said one totalizer, and a movable stop engaging said parts to normally hold said parts in inoperative position, said stop being connected with said coupling means to permit said parts to operate only when one of said totalizers is coupled with said registering means.

2. A cash register or the like machine, comprising registering means, clerk-identifying selector means, a plurality of selective operable totalizers, coupling means connected with said selector means to be controlled thereby and selectively engageable with only one of said totalizers at a time for coupling it with said registering means to accumulate the sales amounts of one clerk selected by said selector means, a plurality of longitudinally displaceable indicating bars arranged side by side and parallel to one another and visible from the outside, each of said bars having a rack, a plurality of unidirectional stepping drives having respective pawls engageable with said racks and having respective drive levers reciprocable between two positions and carrying said respective pawls for progressively displacing said respective bars when said levers are actuated, each of said totalizers having a cam engageable with one of said respective levers to actuate said lever.

3. With a cash register or the like machine having a housing and selectively operable totalizers in said housing, the combination of comparative indicating apparatus disposed in said housing and having a plurality of elongated slide members arranged side by side and parallel to one another, said members having a given rest position and having respective indicia means visible from the outside of said housing and aligned with one another when said members are in said position, said members being individually and longitudinally displaceable from said position so that said indicia means jointly show a graph indicative of relative member displacements, and unidirectional drive means operatively connecting said members with said respective totalizers for displacing said members the same direction and in accordance with the respective totalized amounts.

4. In combination, a cash register or the like machine having a housing and clerk-identifying selector means, a plurality of totalizers in said housing selectively operable under control by said selector means to accumulate amounts indicative of the activities of the respective clerks, a plurality of indicating slide members mutually juxtaposed in said housing and linearly displaceable in parallel relation to one another, reciprocable stepping drive means engageable with said respective members, each of said totalizers having a revolvable cam, and each of said drive means having a part engageable with one of said respective cams for reciprocating said drive means to progressively displace said respective indicating members one step in a fixed direction for a given amount of revolution of said respective cams, said slide members having respective indicia means visible from the outside of said housing and forming jointly a graph indicative of the approximate amounts added by said respective totalizers.

5. In combination, a cash register or the like machine having a housing, clerk-identifying selector means, a plurality of totalizers in said housing selectively operable under control by said selector means to accumulate amounts indicative of the activities of the respective clerks, a plurality of indicating members disposed in said housing and being progressively movable independently of one another, said indicating members have respective mutually adjacent portions visible from the outside of said housing over their entire paths of progressive motion, a plurality of stepping drive means engageable with said respective members, each of said totalizers having a digit transfer wheel, and each of said drive means having a part engageable with said transfer wheel for controlling said drive means to move said respective members one step when said transfer wheel moves from position nine to position zero.

6. In combination, a cash register or the like machine having a housing, clerk-identifying selector means, a plurality of totalizers in said housing selectively operable under control by said selector means to accumulate the sales amounts of the respective clerks, indicating devices disposed in said housing and having graph-type indicating means operatively connected with said respective totalizers for comparative indication of said amounts, said indicating means having respective individually and progressively displaceable members juxtaposed to one another and visible from the outside of said housing over their respective entire paths of progressive displacement.

ALBERT KLAAR.

REFERENCES CITED

The following references are of record in the file of this patent:

UNITED STATES PATENTS

| Number | Name | Date |
|--------|------|------|
| 803,714 | Riddle | Nov. 7, 1905 |
| 1,138,124 | Lawrence | May 4, 1915 |
| 1,438,014 | Blake | Dec. 5, 1922 |
| 1,438,718 | Oswald | Dec. 12, 1922 |
| 1,609,155 | Catell | Nov. 30, 1926 |
| 2,474,074 | Sunstein | June 21, 1949 |